(12) United States Patent
Lin et al.

(10) Patent No.: US 12,365,755 B2
(45) Date of Patent: Jul. 22, 2025

(54) TWO-COMPONENT POLYURETHANE COMPOSITION

(71) Applicants: Dow Global Technologies LLC, Midland, MI (US); Rohm and Haas Company, Collegeville, PA (US)

(72) Inventors: Daoshu Lin, Shanghai (CN); Yan Li, Shanghai (CN); Cheng Shen, Shanghai (CN); Jinfei Wang, Shanghai (CN); Baoqing Zheng, Shanghai (CN); Jia Tang, Shanghai (CN); Dong Yun, Shanghai (CN); Shaoguang Feng, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 560 days.

(21) Appl. No.: 17/760,997

(22) PCT Filed: Oct. 29, 2019

(86) PCT No.: PCT/CN2019/113887
§ 371 (c)(1),
(2) Date: Mar. 16, 2022

(87) PCT Pub. No.: WO2021/081732
PCT Pub. Date: May 6, 2021

(65) Prior Publication Data
US 2022/0298289 A1    Sep. 22, 2022

(51) Int. Cl.
| | | |
|---|---|---|
| C08G 18/28 | (2006.01) | |
| C08G 18/62 | (2006.01) | |
| C08G 18/79 | (2006.01) | |
| C09D 133/06 | (2006.01) | |
| C09D 175/04 | (2006.01) | |
| C09D 175/08 | (2006.01) | |

(52) U.S. Cl.
CPC ....... *C08G 18/283* (2013.01); *C08G 18/6291* (2013.01); *C08G 18/792* (2013.01); *C09D 175/08* (2013.01); *C08G 18/6229* (2013.01); *C09D 133/066* (2013.01); *C09D 175/04* (2013.01)

(58) Field of Classification Search
CPC .............. C08G 18/283; C08G 18/792; C08G 18/6229; C09D 175/04; C09D 133/066
See application file for complete search history.

(56) References Cited

U.S. PATENT DOCUMENTS

| | | |
|---|---|---|
| 5,308,912 A | 5/1994 | Margotte et al. |
| 5,663,272 A | 9/1997 | Slack et al. |
| 6,028,158 A | 2/2000 | Slack et al. |
| 7,005,470 B2 | 2/2006 | Probst et al. |
| 7,220,338 B2 | 5/2007 | Chen et al. |
| 7,414,091 B2 | 8/2008 | Chen et al. |
| 8,334,323 B2 | 12/2012 | Varineau et al. |
| 9,365,739 B2 | 6/2016 | Dombrowski et al. |
| 10,100,377 B2 | 10/2018 | Eryazici et al. |
| 2006/0155095 A1 | 7/2006 | Daussin et al. |
| 2011/0098492 A1 | 4/2011 | Varineau et al. |
| 2011/0319669 A1 | 12/2011 | Yu et al. |
| 2013/0231508 A1 | 9/2013 | Maynard et al. |

FOREIGN PATENT DOCUMENTS

| | | |
|---|---|---|
| CA | 2480062 C | 8/2011 |
| CA | 2960249 A1 | 9/2017 |
| CN | 1624009 A | 6/2005 |
| CN | 1656186 A | 8/2005 |
| CN | 101918471 A | 12/2010 |
| CN | 102958887 A | 3/2013 |
| CN | 103270012 A | 8/2013 |
| CN | 103881046 A | 6/2014 |
| CN | 106479298 A | 3/2017 |
| CN | 107805291 A | 3/2018 |
| EP | 3517559 A1 | 7/2019 |
| JP | 05972755 B2 | 8/2016 |
| WO | 2014158661 A1 | 10/2014 |

OTHER PUBLICATIONS

Supplementary European Search Report for the corresponding European Application No. 19950524, Date of Mailing: May 19, 2023; 4 pages.
Notification of Reason for Refusal for the corresponding Japanese Application No. 2022-520924, Drafting Date: Aug. 30, 2023; English translation, 3 pages.

*Primary Examiner* — Arrie L Reuther
*Assistant Examiner* — David R. Foss
(74) *Attorney, Agent, or Firm* — CANTOR COLBURN LLP

(57) ABSTRACT

A two-component polyurethane composition comprising (A) an aqueous dispersion comprising an emulsion polymer and from 2% to 20% of an alcohol alkoxylate of formula (I), by weight based on the weight of the emulsion polymer, and (B) a polyisocyanate; the two-component polyurethane composition can provide coatings with a high distinctness of image.

17 Claims, No Drawings

TWO-COMPONENT POLYURETHANE COMPOSITION

FIELD OF THE INVENTION

The present invention relates to a two-component polyurethane composition and a process of preparing the same.

INTRODUCTION

Conventional solvent-borne two-component polyurethane coating compositions provide coatings with excellent appearance but usually contain high volatile organic compound (VOC) content. Water-borne two-component polyurethane compositions comprising water-dispersible isocyanates and conventional emulsion polymers significantly reduce the VOC content and have a reasonable cure speed, but yet fail to provide coatings with similar appearance (such as gloss and fullness) as solvent-borne two-component polyurethane coating compositions. Distinctness of image (DOI) measures the sharpness of a reflected image on a surface (e.g., a coating surface) and is an indication of the perfection of a reflection, and lack of haze or "orange peel" in a surface. It is desirable for a coating surface to afford a high DOI (e.g., 74 or higher). It is also desirable for the polyurethane compositions to provide coatings with high gloss, e.g., 85 or higher at 60 degree and 75 or higher at 20 degree. In addition, coatings are also required to maintain good appearance after exposure, e.g., showing blister resistance to ultraviolet (UV) light.

Therefore, there remains a need to provide a two-component polyurethane composition suitable for producing high DOI and high gloss coating films without compromising other properties (e.g., blister resistance and hardness).

SUMMARY OF THE INVENTION

The present invention provides a two-component polyurethane composition by combining a specific emulsion polymer and a specific alcohol alkoxylate with a polyisocyanate, particularly suitable for coatings. The polyurethane composition can provide coatings made therefrom with a high DOI of 74 or more while offering high gloss as indicated by a 60° gloss of 85 or higher and a 20° gloss of 75 or higher, hardness of H or harder, and/or blister resistance to UV light. These properties may be measured according to the test methods described in the Examples section below.

In a first aspect, the present invention is a two-component polyurethane composition comprising, (A) an aqueous dispersion comprising an emulsion polymer and from 2% to 20% of an alcohol alkoxylate, by weight based on the weight of the emulsion polymer;

wherein the emulsion polymer comprises, by weight based on the weight of the emulsion polymer, greater than 15% of structural units of a hydroxy-functional alkyl (meth)acrylate;

wherein the alcohol alkoxylate having a molecular weight of 1,000 g/mol or less has formula (I),

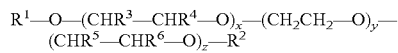

where $R^1$ is a $C_6$-$C_{18}$ branched aliphatic group; $R^2$ is hydrogen, a $C_1$-$C_4$ linear or branched aliphatic group, or benzyl; $R^3$ and $R^4$ are each independently hydrogen or a $C_1$-$C_6$ aliphatic group, provided that $R^3$ and $R^4$ together contain from 1 to 6 carbon atoms; $R^5$ and $R^6$ are each independently hydrogen or a $C_1$-$C_6$ aliphatic group, provided that $R^5$ and $R^6$ together contain from 1 to 6 carbon atoms; x is an average value ranging from 0 to 10; y is an average value ranging from 5 to 15; and z is an average value ranging from 0 to 5; provided that x+z>0;

wherein the alcohol alkoxylate comprises, by weight based on the weight of the alcohol alkoxylate, from 25% to 75% of ethylene oxide units; and (B) a polyisocyanate.

In a second aspect, the present invention is a process of preparing a two-component polyurethane composition of the first aspect. The process comprises:

(i) providing an aqueous dispersion comprising an emulsion polymer and from 2% to 20% of an alcohol alkoxylate, by weight based on the weight of the emulsion polymer;

wherein the emulsion polymer comprises, by weight based on the weight of the emulsion polymer, greater than 15% of structural units of a hydroxy-functional alkyl (meth)acrylate;

wherein the alcohol alkoxylate having a molecular weight of 1000 g/mole or less has formula (I),

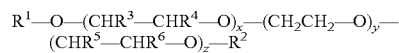

where $R^1$ is a $C_6$-$C_{18}$ branched aliphatic group; $R^2$ is hydrogen, a $C_1$-$C_4$ linear or branched aliphatic group, or benzyl; $R^3$ and $R^4$ are each independently hydrogen or a $C_1$-$C_6$ aliphatic group, provided that $R^3$ and $R^4$ together contain from 1 to 6 carbon atoms; $R^5$ and $R^6$ are each independently hydrogen or a $C_1$-$C_6$ aliphatic group, provided that $R^5$ and $R^6$ together contain from 1 to 6 carbon atoms; x is an average value ranging from 0 to 10; y is an average value ranging from 5 to 15; and z is an average value ranging from 0 to 5; provided that x+z>0;

wherein the alcohol alkoxylate comprises, by weight based on the weight of the alcohol alkoxylate, from 25% to 75% of ethylene oxide units; and (ii) mixing the aqueous dispersion from step (i) with a polyisocyanate.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, or mixtures thereof.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

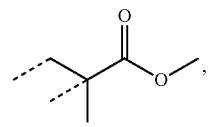

where the dotted lines represent the points of attachment of the structural unit to the polymer backbone.

"Polyisocyanate" refers to any isocyanate functional molecule having two or more isocyanate groups.

"Aliphatic group" refers to a hydrocarbon chain, e.g., an alkyl group.

The two-component polyurethane composition of the present invention typically comprises part A and part B, where the part A may comprise an aqueous dispersion comprising an alcohol alkoxylate and an emulsion polymer, and the part B may comprise one or more polyisocyanates. The alcohol alkoxylate useful in the present invention may have formula (I),

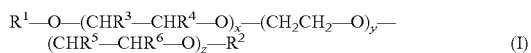

where $R^1$ is a $C_6$-$C_{18}$ branched aliphatic group; preferably, $R^1$ contains from 8 to 18 carbon atoms, from 8 to 16 carbon atoms, from 8 to 14 carbon atoms, from 10 to 14 carbon atoms, or from 12 to 14 carbon atoms; and more preferably, $R^1$ is 2-ethyl hexyl or

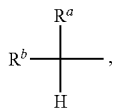

where $R^a$ and $R^b$ are each independently a $C_1$-$C_{17}$ aliphatic group, provided that $R^a$ and $R^b$ together contain from 7 to 17 carbon atoms, from 7 to 15 carbon atoms, from 7 to 13, or from 11 to 13 carbon atoms;

$R^2$ is hydrogen, a $C_1$-$C_4$ linear or branched aliphatic group, or benzyl; preferably, hydrogen;

$R^3$ and $R^4$ are each independently hydrogen or a $C_1$-$C_6$ aliphatic group, provided that $R^3$ and $R^4$ together contain from 1 to 6 carbon atoms; preferably, $R^3$ and $R^4$ are each independently hydrogen, methyl, or ethyl;

$R^5$ and $R^6$ are each independently hydrogen or a $C_1$-$C_6$ aliphatic group, provided that $R^5$ and $R^6$ together contain from 1 to 6 carbon atoms; preferably, $R^5$ and $R^6$ are each independently hydrogen, methyl, or ethyl;

x is an average value ranging from 0 to 10, from 0 to 8, from 2 to 7, or from 3 to 6;

y is an average value ranging from 5 to 15, from 5 to 14, from 6 to 13, or from 7 to 12;

z is an average value ranging from 0 to 5, from 0 to 4, from 0.5 to 3.5, or from 1 to 3;

provided that x+z>0.

The total value of x, y, and z in formula (I) can be a value sufficient to give the alcohol alkoxylate a molecular weight as described below, for example, from 5.5 to 20, from 7 to 17, from 8 to 16, or from 9 to 15.

The alcohol alkoxylate useful in the present invention may have a molecular weight in the range of 1,000 gram per mole (g/mol), for example, 400 g/mol or more, 420 g/mol or more, 440 g/mol or more, 450 g/mol or more, 460 g/mol or more, 480 g/mol or more, 500 g/mol or more, 520 g/mol or more, 550 g/mol or more, 560 g/mol or more, 580 g/mol or more, 600 g/mol or more, 620 g/mol or more, 650 g/mol or more, 660 g/mol or more, or even 680 g/mol or more, and at the same time, 980 g/mol or less, 960 g/mol or less, 950 g/mol or less, 940 g/mol or less, 920 g/mol or less, 910 g/mol or less, 900 g/mol or less, 880 g/mol or less, 860 g/mol or less, 850 g/mol or less, 840 g/mol or less, or even 820 g/mol or less. Molecular weight herein refers to number average molecular weight (Mn) and calculated by 56100 (mg/mol)/OHV (mgKOH/g), where OHV represents hydroxyl value of the alcohol alkoxylate determined by ASTM D4274-2011.

The alcohol alkoxylate useful in the present invention may comprise, by weight based on the weight of the alcohol alkoxylate, ethylene oxide units (also as ethylene oxide chains, —(CH$_2$CH$_2$—O)—) in an amount of 25% or more, 26% or more, 27% or more, 28% or more, 29% or more, 30% or more, 32% or more, 35% or more, 38% or more, 40% or more, 42% or more, 45% or more, 48% or more, or even 50% or more, at the same time, 75% or less, 72% or less, 70% or less, 68% or less, 67% or less, 66% or less, 65% or less, or even 64% or less.

In some embodiments, the alcohol alkoxylate has the structure of formula (I), wherein $R^3$ and $R^4$ are different and each independently hydrogen or methyl, z is 0, and the total value of x and y is from 7 to 14. Preferably, $R^1$ is 2-ethyl hexyl. More preferably, the ethylene oxide units are present in an amount of 30% to 70% or from 35% to 60%, by weight based on the weight of the alcohol alkoxylate.

In some other embodiments, the alcohol alkoxylate has the structure of formula (I), wherein $R^5$ and $R^6$ are different and each independently hydrogen or ethyl, x is 0, y is from 7 to 14, and z is from 1 to 2. Preferably, $R^1$ is a

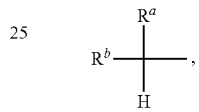

$R^a$ and $R^b$ are as defined above, for example, $R^a$ and $R^b$ together contain from 11 to 13 carbon atoms. More preferably, the ethylene oxide units are present in an amount of 40% to 70% or from 45% to 68%, by weight based on the weight of the alcohol alkoxylate.

The alcohol alkoxylate useful in the present invention may be present in the aqueous dispersion, by weight based on the weight of the emulsion polymer, in an amount of 2% or more, 2.1% or more, 2.2% or more, 2.3% or more, 2.4% or more, 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, or even 10% or more, at the same time, 20% or less, 19% or less, 18% or less, 17% or less, 16% or less, 15% or less, 14.5% or less, 14% or less, 13.5% or less, 13% or less, 12.5% or less, 12% or less, 11.5% or less, 11% or less, or even 10.5% or less. "Weight of the emulsion polymer" refers to the dry weight of the emulsion polymer.

The aqueous dispersion in the polyurethane composition may further comprise an emulsion polymer. The emulsion polymer useful in the present invention is a hydroxyl group-containing polymer. The emulsion polymer may comprise structural units of one or more hydroxy-functional alkyl (meth)acrylates. Examples of suitable hydroxy-functional alkyl (meth)acrylates include hydroxyethyl (meth)acrylates including, for example, 2-hydroxyethyl acrylate and 2-hydroxyethyl methacrylate; hydroxypropyl (meth)acrylates including, for example, 2-hydroxypropylacrylate, 2-hydroxypropyl methacrylate, 3-hydroxypropyl acrylate, and 3-hydroxypropyl methacrylate; hydroxybutyl (meth)acrylates including, for example, 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; and mixtures thereof. Preferred hydroxy-functional alkyl (meth)acrylates include 2-hydroxyethyl acrylate, 2-hydroxyethyl methacrylate, 3-hydroxypropyl acrylate, 3-hydroxypropyl methacrylate, or mixtures thereof. The emulsion polymer may comprise, by weight based on the weight of the emulsion polymer, greater than 15% of structural units of the hydroxy-functional alkyl (meth)acrylates, for example, 17% or more, 20% or more, 23% or more, 25% or more, 27% or more, 30% or more, or even 32% or more, and at the same time, 50% or less, 48% or less, 45% or less, 42% or less, 40% or less, 38% or less, 36% or less, or even 34% or less.

The emulsion polymer may comprise structural units of one or more acid monomers, salts thereof, or mixtures thereof, such as carboxylic acid monomers, sulfonic acid monomers, phosphorous-containing acid monomers, salts thereof, or mixtures thereof. Examples of suitable phosphorous-containing acid monomers and salts thereof include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R_1)-C(O)-O-(R_2O)_q-P(O)(OH)_2$, wherein $R_1=H$ or $CH_3$, $R_2$=alkylene, such as an ethylene group, a propylene group, or a combination thereof; and q=1-20, such as SIPOMER PAM-100, SIPOMER PAM-200, SIPOMER PAM-300, SIPOMER PAM-600 and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers and salts thereof are selected from the group consisting of phosphoethyl (meth)acrylate, phosphopropyl (meth)acrylate, phosphobutyl (meth)acrylate, allyl ether phosphate, salts thereof, or mixtures thereof; more preferably, phosphoethyl methacrylate (PEM). The carboxylic acid monomers can be α, β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of carboxylic acid monomers include acrylic acid, methacrylic acid, maleic acid, itaconic acid, crotonic acid, fumaric acid, 2-carboxyethyl acrylate, and mixtures thereof. The sulfonic acid monomers and salts thereof may include sodium vinyl sulfonate (SVS), sodium styrene sulfonate (SSS), acrylamido-methyl-propane sulfonate (AMPS) and salts thereof; or mixtures thereof. Preferred carboxylic acid monomers are selected from acrylic acid, methacrylic acid, itaconic acid, and mixtures thereof. The emulsion polymer may comprise structural units of the acid monomers and salts thereof in an amount of 0.1% or more, for example, 0.3% or more, 0.5% or more, 0.8% or more, 1.0% or more, 1.3% or more, 1.5% or more, 1.7% or more, or even 2.0% or more, and at the same time, 10% or less, 8.0% or less, 7.0% or less, 6.0% or less, 5.0% or less, 4.5% or less, 4.0% or less, 3.5% or less, 3.0% or less, or even 2.5% or less, by weight based on the weight of the emulsion polymer.

The emulsion polymer useful in the present invention may also comprise structural units of one or more ethylenically unsaturated functional monomers carrying at least one functional group selected from an amide, acetoacetate, carbonyl, ureido, silane, or amino group. Suitable ethylenically unsaturated functional monomers may include, for example, amino-functional monomers such as dimethylaminoethyl methacrylate, dimethylaminoethyl acrylate, dimethylaminopropyl methacrylate, dimethylaminopropyl acrylate; ureido-functional monomers such as hydroxyethyl ethylene urea methacrylate, hydroxyethyl ethylene urea acrylate, such as SIPOMER WAM II; monomers bearing acetoacetate-functional groups such as acetoacetoxyethyl methacrylate (AAEM), acetoacetoxyethyl acrylate, acetoacetoxypropyl methacrylate, acetoacetoxypropyl acrylate, allyl acetoacetate, acetoacetoxybutyl methacrylate, acetoacetoxybutyl methacrylate, acetoacetamidoethyl methacrylate, acetoacetamidoethyl acrylate; monomers bearing carbonyl-containing groups such as diacetone acrylamide (DAAM), diacetone methacrylamide; monomers bearing amide-functional groups such as acrylamide and methacrylamide; vinyltrialkoxysilanes such as vinyltrimethoxysilane, vinyltriethoxysilane, vinyltris(2-methoxyethoxy)silane, vinyldimethylethoxysilane vinylmethyldiethoxysilane or (meth)acryloxyalkyltrialkoxysilanes such as (meth)acryloxyethyltrimethoxysilane and (meth)acryloxypropyltrimethoxysilane; and mixtures thereof. The emulsion polymer may comprise, by weight based on the weight of the emulsion polymer, from zero to 10% of structural units of the ethylenically unsaturated functional monomer, for example, from 0.1% to 8%, from 0.5% to 6%, from 1% to 5%, or from 2% to 3%.

The emulsion polymer useful in the present invention may also comprise structural units of one or more monoethylenically unsaturated nonionic monomers that are different from the monomers described above. "Nonionic monomers" herein refers to monomers that do not bear an ionic charge between pH=1-14. The monoethylenically unsaturated nonionic monomers may include vinyl aromatic monomers, alkyl (meth)acrylates, acrylonitrile, and mixtures thereof. Suitable vinyl aromatic monomers may include, for example, styrene; substituted styrene such as methylstyrene, alpha-methylstyrene, trans-beta-methylstyrene, 2,4-dimethylstyrene, ethylstyrene, butylstryene, and p-methoxy styrene; o-, m-, and p-methoxy styrene; and p-trifluoromethylstyrene; or mixtures thereof. The alkyl (meth)acrylates can be $C_1$-$C_{20}$-alkyl, $C_1$-$C_{18}$-alkyl, $C_1$-$C_{12}$-alkyl, or $C_1$-$C_4$-alkyl (meth)acrylates. Specific examples of alkyl (meth)acrylates include methyl acrylate, methyl methacrylate, ethyl acrylate, ethyl methacrylate, butyl acrylate, butyl methacrylate, tert-butyl acrylate, tert-butyl methacrylate, iso-butyl acrylate, iso-butyl methacrylate, 2-ethylhexyl acrylate, nonyl acrylate, decyl acrylate, lauryl acrylate, cyclohexyl methacrylate, cyclohexyl acrylate, tert-butyl cyclohexyl methacrylate, trimethylcyclohexyl methacrylate, isobornyl methacrylate, isobornyl acrylate, tetrahydrofuran methacrylate, dicyclopentadienyl acrylate, dicyclopentadienyl methacrylate, and combinations thereof. The monoethylenically unsaturated nonionic monomers preferably include styrene in combination of one or more alkyl (meth)acrylates. Preferred monoethylenically unsaturated nonionic monomers are styrene, methyl methacrylate, cyclohexyl methacrylate, tert-butyl methacrylate, butyl acrylate, 2-ethylhexyl acrylate, or mixtures thereof. The emulsion polymer may comprise, based on the weight of the emulsion polymer, from 30% to 80%, from 40% to 77%, from 50% to 74%, or from 60% to 72% of structural units of the monoethylenically unsaturated nonionic monomers.

The emulsion polymer useful in the present invention may further comprise structural units of one or more multiethylenically unsaturated monomers including di-, tri-, tetra-, or higher multifunctional ethylenically unsaturated monomers. Examples of suitable multiethylenically unsaturated monomers include butadiene, allyl (meth)acrylate, divinyl benzene, ethylene glycol dimethacrylate, butylene glycol dimethacrylate, and mixtures thereof. The emulsion polymer may comprise, by weight based on the weight of the emulsion polymer, from zero to 5% of structural units of the multi-ethylenically unsaturated monomer, for example, 3% or less, 1% or less, 0.5% or less, or even zero.

The emulsion polymer useful in the present invention may have a weight average molecular weight of 50,000 g/mol or less, for example, 5,000 g/mol or more, 6,000 g/mol or more, 7,000 g/mol or more, 8,000 g/mol or more, 9,000 g/mol or more, 10,000 g/mol or more, 11,000 g/mol or more, 12,000 g/mol or more, 13,000 g/mol or more, 14,000 g/mol or more, 15,000 g/mol or more, 16,000 g/mol or more, 17,000 g/mol or more, 18,000 g/mol or more, or even 19,000 g/mol or more, and at the same time, 50,000 g/mol or less, 48,000 g/mol or less, 45,000 g/mol or less, 42,000 g/mol or less, 40,000 g/mol or less, 38,000 g/mol or less, 35,000 g/mol or less, 32,000 g/mol or less, 30,000 g/mol or less, 28,000 g/mol or less, 25,000 g/mol or less, 23,000 g/mol or less, or even 20,000 g/mol or less. Weight average molecular weight of the emulsion polymer herein can be determined by Gel Permeation Chromatography (GPC) as described in the Examples section below.

The emulsion polymer particles dispersed in the aqueous dispersion may have a particle size of from 30 to 500 nanometers (nm), for example, 50 nm or more, 60 nm or more, 70 nm or more, or even 80 nm or more, and at the same time, 300 nm or less, 200 nm or less, 150 nm or less, 120 nm or less, or even 100 nm or less. The particle size herein refers to Z-average size and may be measured by a Brookhaven BI-90 Plus Particle Size Analyzer.

The emulsion polymer useful in the present invention may be present in an amount of from 20% to 70%, from 30% to 55%, from 35% to 50%, or from 40% to 45%, by dry or solids weight based on the total weight of the aqueous dispersion.

The emulsion polymer useful in the present invention may be prepared by emulsion polymerization, of the monomers described above, in an aqueous medium, preferably in the presence of a surfactant. The surfactant is different from the alcohol alkoxylate described above and may be added prior to or during the polymerization of the monomers, or combinations thereof. A portion of the surfactant can also be added after the polymerization. These surfactants can be anionic or nonionic, preferably anionic surfactants such as sulphate surfactants, sulfonate surfactants, or mixtures thereof. These surfactants may be used in a combined amount of 0.1% or more, 0.3% or more, 0.5% or more, 0.7% or more, 0.9% or more, or even 1.2% or more, and at the same time, 5% or less, 4% or less, 3% or less, 2% or less, or even 1.5% or less, by weight based on the total weight of the monomers for preparing the emulsion polymer.

Monomers may be added neat or as an emulsion in water; or added in one or more additions or continuously, linearly or nonlinearly, over the reaction period of preparing the emulsion polymer. Total weight concentration of the monomers described above for preparing the emulsion polymer may be equal to 100%. The dosage of such monomer based on the total weight of the monomers, is substantially the same as the amount of each of these monomers as structural units in the emulsion polymer, based on the weight of the emulsion polymer.

Temperature suitable for polymerization of the monomers may be lower than 100° C., in the range of from 10 to 95° C., or in the range of from 50 to 92° C. Multistage emulsion polymerization using the monomers described above can be used, which at least two stages are formed sequentially, and usually results in the formation of the multistage polymer comprising at least two polymer compositions.

Free radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

One or more chain transfer agents may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used in an effective amount to control the molecular weight of the emulsion polymer, for example, greater than 0.3%, from 0.4% to 20%, from 0.5% to 15%, from 0.6% to 13%, from 0.8% to 10%, from 1% to 8%, from 1.3% to 6%, from 1.5% to 4%, from 1.5% to 3%, or from 2.0% to 2.5%, by weight based on the total weight of the monomers.

Types and levels of the monomers described above may be chosen to provide the obtained emulsion polymer with a glass transition temperature (Tg) suitable for different applications. The emulsion polymer may have a Tg in the range of from 10 to 80° C., from 15 to 75° C., from 20 to 70° C., from 25 to 65° C., from 30 to 60° C., from 35 to 55° C., or from 40 to 50° C. "Tg" as used herein may be determined by differential scanning calorimetry (DSC) according to the test method described in the Examples section below.

After completing the polymerization process, the obtained emulsion polymer dispersion may be neutralized by one or more bases to a pH value, for example, at least 5, from 5.5 to 10, from 6.0 to 9, from 6.2 to 8, from 6.4 to 7.5, or from 6.6 to 7.2. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof. After neutralization, the alcohol alkoxylate may be further added. A portion of the alcohol alkoxylate can be added prior to or during the polymerization of the monomers used for preparing the emulsion polymer, or combinations thereof, and the rest of the alcohol alkoxylate is added after the polymerization. Preferably, all of the alcohol alkoxylate in the polyurethane composition of the present invention is mixed with the emulsion polymer after its polymerization.

The aqueous dispersion in the polyurethane composition may also comprise one or more diols or polyols. Suitable diols or polyols may comprise any cycloaliphatic diol or polyol having a molecular weight of from 100 to 500 and containing one or more 4 to 7 member aliphatic ring, or any oligomeric diol or polyol made from a cycloaliphatic diol or polyol having a molecular weight of from 100 to 500 and comprising at least 30% by weight of cycloaliphatic diol and/or polyol and having a weight average molecular weight of from 200 to 3000, from 200 to 2000, or from 200 to 1000. Examples of such diols or polyols include cyclohexanedimethanol (CHDM), especially 1,3 CHDM, 1,4 CHDM, mixtures thereof, dianhydro-d-glucitol, which has two 5 membered rings, each containing an oxygen atom, 4,8-Bis (hydroxymethyl)tricyclo [5.2.1.02,6] decane, and 2,2,4,4-tetramethyl cyclobutanediol, containing a 4 membered ring.

Oligomeric diols or polyols useful in the present invention may include any oligomers comprising the condensation reaction product of at least 30% preferably, at least 40%, by weight based on the total weight of reactants used to make the oligomer, of, any cycloaliphatic diol and/or polyol having a molecular weight of from 100 to 500 and containing one or more 4 to 7 member aliphatic ring. These oligomeric diols or polyols may include, for example, oligo- or polyesters, short chain alkyds, oligo- or polycarbonates, oligo- or polyethers and oligo- or polylactones having the desired low weight average molecular weight, for example, from 200 to 3000, from 200 to 2000, or from 200 to 1000. Such oligomers may be made by conventional means, such as by bulk polymerization. For example, polyesters may be made, e.g. from diacids or difunctional anhydrides or their salts cycloaliphatic diols or triols having one or more 4 to 7 member aliphatic rings. Likewise, other oligomers may be formed by reacting any cycloaliphatic polyol having a molecular weight of from 100 to 500 and containing one or more 4 to 7 member aliphatic ring in the presence of lactone reactants, e.g. caprolactone, to make polylactone polyols, or in the presence of carbonate reactants, e.g. trimethylene carbonate, to make polycarbonate polyols. An example of a suitable polyester polyol was made by condensing 2 CHDM molecules and 1 oxalic acid molecule, for which the polyol content was calculated as 76.2% by weight. Commercially available diols or polyols may include, for example, K-Flex 188 and K-Flex A308 polyester polyols from King Industries, Inc. (Norwalk, Conn.); UNOXOL™ diol, a mixture of 1,3 CHDM and 1,4 CHDM (The Dow Chemical Company, UNOXOL is a trademark of The Dow Chemical Company); and Polysorb P dianhydro-d-glucitol (Roquette, Lestrem, FR). As used herein the term "molecular weight" when referring to a cycloaliphatic diol or polyol refers to the mass of one mole of that cycloaliphatic diol or polyol in grams. As used herein, the term "weight molecular weight" of the oligomeric diols or polyols is a weight average molecular weight of a sample of that oligomeric diols or polyols as determined by GPC of the sample in tetrahydrofuran solvent as against a polystyrene molecular weight standard as calibration standard. EasiCal PS-2 standard (Agilent Technologies, Inc, Santa Clara, Calif.) against a polystyrene standard.

The diol or polyols included in the aqueous dispersion are either in neat form (for water-soluble diols or polyols), or for less water-soluble diols or polyols, are preferably micronized and stabilized with a stabilizing amount of a surfactant, preferably at a concentration in the range of about 0.5% to 5%, by weight based on total weight of the diols or polyols. Nonionic surfactants are preferred. These diols or polyols may be present in an amount of from zero to 20%, from 0.1% to 15%, or from 0.2% to 10%, by weight based on the total solids weight of diols, polyols and the emulsion polymer.

The polyurethane composition of the present invention further comprises one or more polyisocyanates useful as crosslinkers. The polyisocyanates may include any molecules having 2 or more isocyanate groups, and mixtures thereof. Such polyisocyanates can be aliphatic, alicyclic, aromatic, or mixtures thereof. The polyisocyanates may have an average functionality of >2 or from 2.5 to 10. Examples of suitable polyisocyanates include aliphatic diisocyanates, as well as dimers and trimers thereof, such as, for example, $C_2$-$C_8$ alkylene diisocyanates, such as tetramethylene diisocyanate and hexamethylene diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate; alicyclic diisocyanates, as well as dimers and trimers thereof, such as, for example, isophorone diisocyanate (IPDI) and dicyclohexyl methane diisocyanate (HMDI), 1,4-cyclohexane diisocyanate, and 1,3-bis-(isocyanatomethyl)cyclohexane; aromatic diisocyanates, as well as dimers and trimers thereof, such as, for example, toluene diisocyanate (TDI), and diphenyl methane diisocyanate (MDI). Preferably, the polyisocyanate comprises aliphatic polyisocyanates. More preferably, the polyisocyanates are hexamethylene diisocyanate homopolymers, hexamethylene diisocyanate adducts, isophorone diisocyanate homopolymers, isophorone diisocyanate adducts, or mixtures thereof. The trimers (or isocyanurates) in the polyisocyanate may be prepared by methods known in the art, for example, as disclosed in U.S. Patent Publication No. 2006/0155095A1, to Daussin et al., by trimerizing an alicyclic diisocyanate (e.g. isophorone diisocyanate) in the presence of one or more trimerization catalyst, such as, for example, a tertiary amine or phosphine or a heterogeneous catalyst, and, if desired, in the presence of solvents and/or assistants, such as co-catalysts, expediently at elevated temperature, until the desired isocyanate (NCO) content has been reached, and then deactivating the catalyst using inorganic and organic acids, the corresponding acid-halides and alkylating agents and, preferably, heating. Isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified by conventional methods to contain urethane, urea, imino-s-triazine, uretonimine or carbodiimide moieties. Preferably, the polyisocyanate useful in the present invention is selected from the group consisting of an aliphatic diisocyanate, dimers and trimers thereof, or mixtures thereof.

The polyisocyanate useful in the present invention may include one or more polyisocyanate prepolymers, which may be formed by reaction of bis(isocyanotomethyl)cyclohexane and/or another aliphatic diisocyanate with a monol, diol, diamine, or monoamine, which is then modified by the reaction of additional isocyanate to form allophanate or biuret modified prepolymers. Such prepolymers may further comprise a polyalkoxy or polyether chain. Alternatively, such prepolymers can then be mixed with a trimerization catalyst giving an allophanate or biuret modified polyisocyanate isocyanurate compositions. Preparation of such allophanate or biuret prepolymers, followed by trimerization, is known in the art, see for example, U.S. Pat. Nos. 5,663,272 and 6,028,158. Still further, suitable polyisocyanates may be modified by an ionic compound such as aminosulfonic acid.

Commercially available polyisocyanates may include, for example, Desmodur N3300, N3600, and N3900 polyisocyanates and Bayhydur XP 2655, 401-60 and 401-70 polyisocyanates (Covestro); Tolonate HDT, HDT-LV and HDT-LV2, and Easaqua L 600 polyisocyanates (Vencorex Chemicals); DURANATE TLA-100 and TMA-100 polyisocyanates (AsahiKASEI); and Aquolin 268, 269 and 270 polyisocyanates (Wanhua Chemicals).

The polyisocyanate useful in the present invention can be used alone or diluted with one or more solvents to form a polyisocyanate solution, prior to mixing with the part A. Such solvents (also as "diluting solvents") can reduce the viscosity of the polyisocyanate and have no reactivity with the polyisocyanate. The solvent may be used in an amount of from 5% to 150%, from 15% to 130%, from 20% to 120%, or from 30% to 100%, by weight based on the weight of the polyisocyanate. Suitable diluting solvents may include, for example, propylene glycol diacetate, propylene glycol methyl ether acetate, dipropylene glycol dimethyl ether, or mixtures thereof.

The polyurethane composition of the present invention may have equivalent ratios of the total number of isocyanate group equivalents in the polyisocyanates, which may contain several different polyisocyanates, to the total number of hydroxyl group equivalents in the aqueous dispersion, which may comprise the emulsion polymer, the alcohol alkoxylate, and optionally, the diols or polyols, in the range of, for example, from 0.7:1 to 4:1, from 0.8:1 to 3:1, from 0.9:1 to 2.5:1, or from 1:1 to 1.5:1.

The polyurethane composition of the present invention may further comprise one or more catalysts to enhance curing. The catalyst can be any suitable catalyst for two-component polyurethane composition, including, for example, metal-based catalysts such as tin-, bismuth-, zinc-, aluminum-, zirconium-containing catalysts or tertiary amine catalysts including aliphatic and cyclo-aliphatic tertiary amine catalysts which are mono-, di- or tri-amines, and mixtures thereof. Examples of suitable metal-based catalysts include dibutyltin dilaurate, dibutyltin mercaptide, dibutyltin sulfide, dimethyltin mercaptide, dibutyltin mercaptoester, zirconium dionate, Al dionate, bismuth neodecanoate, and zinc amine compounds. Suitable tertiary amine catalysts may include, for example, triethylene diamine, triethylene amine, 1,4-diazabicyclo[2.2.2]octane, 6-(dibutylamino)-1,8-diazabicyclo[5.4.0]undec-7-ene, dimethyl cyclohexyl amine, and mixtures thereof. The catalyst may be present in an amount of from 0.01% to 2.5% or from 0.1% to 1.0%, by weight based on the total polyisocyanate and hydroxy group-containing component (e.g., the emulsion polymer, the alcohol alkoxylate, and optionally the diols or polyols) solids.

The polyurethane composition of the present invention may further comprise one or more pigments. The term "pigment" herein refers to a particulate inorganic or organic material which is capable of materially contributing to the opacity, the color, or hiding capability of a coating. Inorganic pigments typically having a refractive index greater than 1.8 may include, for example, titanium dioxide ($TiO_2$), zinc oxide, zinc sulfide, iron oxide, barium sulfate, barium carbonate, or mixtures thereof. Examples of suitable organic pigments include phthalo blue, phthalo green, monoazo yellow, carbon black, or mixtures thereof. Preferred pigment used in the present invention is $TiO_2$. The polyurethane composition may also comprise one or more extenders. The term "extender" refers to a particulate material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The polyurethane composition may have a pigment volume concentration (PVC) of from zero to 75%, from 5% to 50%, or from 10% to 30%.

The polyurethane composition of the present invention may further comprise one or more coalescents. "Coalescents" herein refer to solvents that fuse polymer particles into a continuous film under ambient condition. Examples of suitable coalescents include dipropylene glycol n-butyl ether, propylene glycol n-butyl ether, propylene glycol methyl ether, 2-n-butoxyethanol, dipropylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, aromatic hydrocarbons such as Solvesso series from ExxonMobil, 2,2,4-trimethyl-1,3-pentanediol monoisobutyrate such as Texanol ester alcohol from Eastman, or mixtures thereof. The concentration of the coalescent may be, by weight based on the weight of the emulsion polymer, from zero to 50%, from 5% to 40%, or from 10% to 25%.

The polyurethane composition of the present invention may further comprise conventional additives such as, for example, light stabilizers, ultraviolet (UV) absorbing compounds, leveling agents, wetting agents, dispersants, neutralizers, defoamers, or rheology modifiers, or mixtures thereof. These additives may be present in an amount of from zero to 20%, from 1 to 10%, by weight based on the weight of the polyurethane composition.

The polyurethane composition of the present invention may be prepared with techniques known in the art. A process of preparing the polyurethane composition typically comprises (i) providing the aqueous dispersion comprising the emulsion polymer, the alcohol alkoxylate, and optionally, the diols or polyols, pigments, and other additives; and (ii) mixing the aqueous dispersion from step (i) with the polyisocyanate. The aqueous dispersion in the part A may be prepared by providing the emulsion polymer that is prepared by emulsion polymerization of the monomers described above and then admixing the emulsion polymer with the alcohol alkoxylate. In this case, all of the alcohol alkoxylate in the polyurethane composition is preferably included into the aqueous dispersion in the part A after the emulsion polymerization. The polyisocyanate in the part B is preferably diluted with the solvent. The part A and the part B may be mixed immediately before application. The polyurethane composition can be cured at ambient temperature (25° C.), or at temperatures ranging from 4° C. to 150° C., preferably, from ambient conditions to 80° C. Cure temperatures may be varied depending on the substrate. Curing times generally range from 10 minutes at elevated temperatures to 1 to 14 days at from 10 to 50° C. Examples of suitable substrates include metals, wood, plastics, concrete, cementious substrates, stones, asphalt, elastomeric substrates, glass, or fabrics.

The polyurethane composition of the present invention is useful for producing coatings, with or without a pigment or extender, an adhesive, a sealant, a primer, a caulk composition. The polyurethane composition can provide an enlarged formulation window for achieving an acceptable DOI, for example, the aqueous dispersion comprising the emulsion polymer and the alcohol alkoxylate enables the polyurethane composition having a much wider range of polyisocyanates, particularly, the aliphatic polyisocyanates with or without a polyalkoxy chain or an ionic compound modification, while still achieving a high DOI of 74 or more. Preferably, the two-component polyurethane composition provides coatings made therefrom with a DOI of 75 or more, 76 or more, 80 or more, or even 85 or more. The polyurethane composition can provide coatings made therefrom with a 60° gloss of 85 or higher and a 20° gloss of 75 or higher. The polyurethane composition may provide coatings made therefrom with a hardness of H or harder. DOI, gloss, and hardness can be measured according to the test methods described in the Examples section below.

The present invention further provides polyurethane coatings made from the two-component polyurethane composition on any of the substrates mentioned above. Such coatings can be multilayer coatings over a primer layer and, optionally, a basecoat or color coat. The coatings can be coatings for agricultural, construction and earth-moving equipment; architectural coatings; general industrial finish coatings; marine and protective coatings; automotive coatings; auto refinish coatings; plastic coatings; wood coatings, coil coatings; and civil engineering coatings.

EXAMPLES

Some embodiments of the invention will now be described in the following Examples, wherein all parts and percentages are by weight unless otherwise specified.

Styrene (ST), 2-ethylhexyl acrylate (EHA), methacrylic acid (MAA), acrylic acid (AA), and methyl methacrylate (MMA) are all available from Langyuan Chemical Co., Ltd.

Hydroxyethyl methacrylate (HEMA), n-Dodecyl mercaptan (n-DDM), t-butyl hydroperoxide (t-BHP), ammonia persulfate (APS), isoascorbic acid (IAA), and ethylenediamine tetraacetic acid (EDTA) tetrasodium salt are all available from Sinopharm Chemical Reagent Co., Ltd.

Phosphoethyl methacrylate (PEM) and acetoacetoxy ethyl methacrylate (AAEM) are available from Solvay.

DISPONIL Fes 993 (Fes 993) non-reactive surfactant, available from BASF, is a branched alcohol ethoxylate sulphate, sodium salt, with ethylene oxide (EO) unit of 11.

OROTAN™ 681 dispersant is available from The Dow Chemical Company.

Tego Twin 4100 wetting agent is available from Evonik Industries.

Ti-Pure R-706 titanium dioxide (pigment) is available from The Chemours Company.

TEGO Airex 902 W (902W) defoamer is available from Evonik Industries.

DOWANOL™ DPnB dipropylene glycol n-butyl ether and DOWANOL PM propylene glycol methyl ether, both available from The Dow Chemical Company, are used as coalescents.

DOWANOL™ PGDA propylene glycol diacetate, available from The Dow Chemical Company, is used as a diluting solvent for polyisocyanates.

ACRYSOL™ RM-8W rheology modifier, available from The Dow Chemical Company, is a hydrophobically modified ethylene oxide urethane (HEUR).

Desmodur N3600 hexamethylene diisocyanate trimer is available from Covestro.

OROTAN, DOWANOL, and ACRYSOL are all trademarks of The Dow Chemical Company.

Alcohol alkoxylates given in Table 1 below are all available from The Dow Chemical Company.

TABLE 1

| Alcohol alkoxylate | Product description | EO% | Mn, g/mol |
| --- | --- | --- | --- |
| PAO1 | Ethoxylated and butoxylated $C_{12}$-$C_{14}$ secondary alcohol | 55% | 710 |
| PAO2 | Ethoxylated and butoxylated $C_{12}$-$C_{14}$ secondary alcohol | 50% | 780 |
| PAO3 | Ethoxylated and butoxylated $C_{12}$-$C_{14}$ secondary alcohol | 62% | 840 |
| PAO4 | Ethoxylated and propoxylated 2-ethyl hexanol | 38% | 680 |
| PAO5 | Ethoxylated and propoxylated 2-ethyl hexanol | 48% | 820 |
| PAO6 | Ethoxylated $C_{12}$-$C_{14}$ secondary alcohol | 40% | 330 |
| PAO7 | Ethoxylated $C_{12}$-$C_{14}$ secondary alcohol | 82% | 1080 |
| PAO8 | Ethoxylated and propoxylated 2-ethyl hexanol | 24% | 550 |
| PAO9 | Ethoxylated and propoxylated 2-ethyl hexanol | 60% | 1040 |
| PAO10 | Polyalkylene glycol | 75% | 980 |
| PAO11 | Butanol-initiated polyalkylene glycol | 50% | 750 |
| PAO12 | Polyalkylene glycol | 60% | 1900 |
| PAO13 | Polyethylene glycol | 100% | 600 |
| PAO14 | Butanol-initiated polybutylene glycol | 0 | 750 |
| PAO15 | Dodecanol-initiated polyalkylene glycol | 0 | 950 |
| PAO16 | Ethoxylated and propoxylated linear $C_8$-$C_{14}$ alcohol | 50% | 658 |

The following standard analytical equipment, test methods and synthesis process are used in the Examples.

Particle Size Measurement

The particle size of polymer particles in an aqueous dispersion was measured by using Brookhaven BI-90 Plus Particle Size Analyzer, which employs the technique of photon correlation spectroscopy (light scatter of sample particles). This method involved diluting 2 drops of the aqueous dispersion to be tested in 20 mL of 0.01 M sodium chloride (NaCl) solution, and further diluting the resultant mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

Tg Measurement

Tg was measured by DSC. A 5-10 milligram (mg) sample was analyzed in a sealed aluminum pan on a TA Instrument DSC Q2000 fitted with an auto-sampler under nitrogen atmosphere. Tg measurement by DSC was with three cycles including, from −40 to 180° C., 10° C./min (1$^{st}$ cycle, then hold for 5 minutes (min) to erase thermal history of the sample), from 180 to −40° C., 10° C./min (2$^{nd}$ cycle), and from −40 to 180° C., 10° C./min (3$^{rd}$ cycle). Tg was obtained from the 3$^{rd}$ cycle by taking the mid-point in the heat flow versus temperature transition as the Tg value.

GPC Analysis

GPC analysis of emulsion polymers was performed generally by Agilent 1200. A sample was dissolved in tetrahydrofuran (THF)/formic acid (FA) (5%) with a concentration of 2 mg/mL and then filtered through 0.45 μm polytetrafluoroethylene (PTFE) filter prior to GPC analysis. The GPC analysis was conducted using the following conditions:

Column: One PLgel GUARD columns (10 μm, 50 millimeters (mm)×7.5 mm), Two Mixed B columns (7.8 mm×300 mm) in tandem; column temperature: 40° C.; mobile phase: THF/FA (5%); flow rate: 1.0 mL/min; Injection volume: 100 μL; detector: Agilent Refractive Index detector, 40° C.; and calibration curve: PL Polystyrene I Narrow standards with molecular weights ranging from 2329000 to 580 g/mol, using polynom 3 fitness.

Gloss Test

Gloss measurement was performed at the given angle using a BYK Gardener micro-TRI-gloss meter (BYK-Gardner USA, Columbia, Md.), according to ASTM D523 (1999). Test two-component polyurethane compositions, immediately after mixing all ingredients therein, were drawn down on aluminum panels (Q-panel A-46) at 150 μm wet thickness. After drying at room temperature for 20 min, the panels were further dried at 60° C. for 40 min, and then gloss was measured. An average of three separate readings was reported. An acceptable gloss is 85 or more at 60° and 75 or higher at 20°.

Hardness Test

Pencil hardness test was performed according to ASTM D3363 (2011) on steel substrate (Q-panel R-46). Test two-component polyurethane compositions were drawn down on aluminum panels (Q-panel A-46) at 150 μm wet thickness and allowed to dry at room temperature for 20 min, further at 60° C. for 40 min, and finally at room temperature for 7 days. The obtained coated panels were used for the pencil hardness test. The hardness of pencil lead was recorded when the pencil did not cut into or gouge the film. H or harder is acceptable.

Distinctness of Image (DOI) Test

DOI measurement was performed according to ASTM D5767-95 (2004) (Standard Test Methods for Instrumental Measurement of Distinctness-of-Image Gloss of Coating Surfaces), using a BYK Gardener micro-wave-scan meter (BYK-Gardner USA, Columbia, Md.). A two-component polyurethane composition, immediately after mixing all ingredients therein, was drawn down on aluminum panels (Q-panel A-36) at 200 μm wet thickness. After drying at room temperature for 20 min, the panels were further allowed to dry at 60° C. for 40 min. For each panel, an average of three separate readings was recorded for the DOI value. The higher DOI, the better. If the DOI of a coating is too low to be measured, the BYK Gardener micro-wave-scan meter reading will be shown as "not measurable, dullness>55" and recorded as "not measurable" in Table 4 below. When a reflected object is viewed in such a coating the image becomes fuzzy and distorted.

Blister Resistance after Accelerated Weathering Test (QUV)

Test paint formulations were applied onto aluminum panels using an applicator to form 200 μm wet films. Then test panels were dried for one week in a constant temperature room (CTR, 23±2° C.; (45~65%)±10% Relative Humidity) and then cut into size of 76 mm*229 mm (3 inch*9 inch to fit QUV racks. The starting time was recorded. The test panels were put into a QUV equipment (QUV/Se QUV Accelerated Weathering Tester from Q-Lab Corporation, 313 nm light source UVB, and 0.77 w/m$^2$ irradiance intensity) with the test area facing inward. One cycle QUV consisted of 4-hour UV irradiation at 60° C. followed by 4-hour water spray at 50° C. After multiple cycles in the QUV equipment for a total of 250 hours, all the panels were removed from the QUV equipment. These panels were dried at room temperature, and the degree of blisters of paint panels was observed by the naked eye and rated according to the size of blister as follows, 5: no blister; 4: blister with diameter (D) smaller than 0.2 mm; 3: blister with 0.2≤D<0.3 mm; 2: blister with 0.3≤D<0.5 mm; and 1: blister with 0.5≤D<0.7 mm.

Solids Content

Solids content was measured by weighing 0.7±0.1 g of a sample (wet weight of the sample is denoted as "W1"), putting into an aluminum pan (weight of aluminum pan is denoted as "W2") in an oven at 150° C. for 25 min, and then cooling the aluminum pan with the dried sample and weighing a total weight denoted as "W3". Solids content of the sample is calculated by (W3−W2)/W1*100%.

Synthesis of Polymer Dispersion 1 (PD1)

A monomer emulsion was prepared by mixing 318 grams (g) of deionized (DI) water, (23 g) of Fes 993 surfactant (30%), MMA (149 g), ST (306 g), EHA (176 g), HEMA (304 g), AAEM (51 g), MAA (16 g), PEM (16 g), and n-DDM (21 g).

DI water (600 g) and Fes 993 surfactant (30%) (43 g) were charged to a five-liter multi-neck flask fitted with mechanical stirring. The contents of the flask were heated to 90° C. under nitrogen atmosphere. Then, aqueous ammonia (2.5 g, 25%) in DI water (16.9 g), monomer emulsion (29 g), and ammonium persulfate (APS) (2.0 g) in DI water (16.9 g) were added to the stirred flask, followed by a rinse of DI water (3.75 g). The remaining monomer emulsion was further added at 86° C. over 160 min, followed by a rinse of DI water (30 g). At the end of polymerization, FeSO$_4$.7H$_2$O (0.005 g) in DI water (15.75 g) mixed with EDTA tetrasodium salt (0.005 g) in DI water (15.75 g), a solution of t-BHP (70%, 1.6 g) in DI water (32.8 g) and a solution of IAA (0.8 g) in DI water (34.3 g), a solution of t-BHP (0.8 g) in DI water (16.4 g), and a solution of IAA (0.4 g) in DI water (17.2 g) were all added to the flask at 60° C., then ammonia (25%, 7.0 g) in DI water (16.65 g) was added at 50° C. to obtain an aqueous dispersion.

Synthesis of Polymer Dispersion 2 (PD2)

A monomer emulsion was prepared by mixing DI water (271 g), Fes 993 surfactant (30%) (40.4 g), MMA (144 g), ST (281 g), EHA (161 g), HEMA (278 g), AAEM (46 g), AA (12 g), PEM (7 g), and n-DDM (37 g).

DI water (568 g) and Fes 993 surfactant (20 g, 30%) were charged to a five-liter multi-neck flask fitted with mechanical stirring. The contents of the flask were heated to 90° C. under nitrogen atmosphere. Then, aqueous ammonia (2.3 g, 25%) in DI water (18 g), the monomer emulsion (76 g), and APS (1.9 g) in DI water (22 g) were added to the stirred flask, followed by a rinse of DI water (4 g). The remaining monomer emulsion was further added at 86° C. over 160 min, followed by a rinse of DI water (30 g). At the end of polymerization, FeSO$_4$.7H$_2$O (0.005 g) in DI water (15.75 g) mixed with EDTA tetrasodium salt (0.005 g) in DI water (15.75 g), a solution of t-BHP (1.4 g, 70% aqueous solution)

in DI water (26 g) and a solution of IAA (0.7 g) in DI water (26 g), a solution of t-BHP (0.4 g) in DI water (8 g), and a solution of IAA (0.2 g) in DI water (8 g) were all added to the flask at 60° C., then ammonia (7.0 g, 25%) in DI water (16.65 g) was added at 50° C. to obtain an aqueous dispersion.

Synthesis of Polymer Dispersion 3 (PD3)

PD3 was prepared as in PD2 except the monomer emulsion was prepared by mixing DI water (271 g), Fes 993 surfactant (30%) (40.4 g), MMA (144 g), ST (281 g), EHA (161 g), HEMA (278 g), AAEM (46 g), AA (12 g), PEM (7 g), and n-DDM (9 g).

Synthesis of Polymer Dispersion 4 (PD4)

PD4 was prepared as in PD2 except the monomer emulsion was prepared by mixing DI water (271 g), Fes 993 surfactant (30%) (40.4 g), MMA (146 g), ST (363 g), EHA (78 g), HEMA (278 g), AAEM (46 g), AA (12 g), PEM (7 g), and n-DDM (19 g).

Synthesis of Polymer Dispersion 5 (PD5)

PD5 was prepared as in PD2 except the monomer emulsion was prepared by mixing DI water (271 g), Fes 993 surfactant (30%) (40.4 g), MMA (31 g), ST (282 g), EHA (275 g), HEMA (278 g), AAEM (46 g), AA (12 g), PEM (7 g), and n-DDM (19 g).

Properties of the obtained aqueous dispersions of emulsion polymers are given in Table 2. These dispersions were used as binders for preparing paint formulations below.

TABLE 2

Properties of Dispersions of Emulsion Polymers

| Polymer Dispersion | Particle size (nm) | pH | Solids (%) | Viscosity[1] (centipoise) | Measured $Tg^2$ (° C.) | $Mn^3$ | $Mw^3$ |
|---|---|---|---|---|---|---|---|
| PD1 | 87 | 6.90 | 40.00 | 2001 | 38 | 7412 | 16860 |
| PD2 | 99 | 6.51 | 41.56 | 246 | 30 | 5286 | 15513 |
| PD3 | 96 | 6.87 | 40.74 | 317 | 47 | 6786 | 24861 |
| PD4 | 99 | 7.21 | 41.00 | 396 | 63 | 3368 | 16671 |
| PD5 | 102 | 6.60 | 40.80 | 759 | 15 | 3013 | 14564 |

[1]Viscosity measured by Brookfield viscometer DV-I Primer (60 rpm, spindle #2);
[2]Tg measured by DSC;
[3]$M_n$ and Mw obtained by the GPC analysis described above.

Examples (Exs) 1-5 and Comparative (Comp) Exs A-D, F-K Paint Formulations

Exs 1-5 and Comp Exs A-D and F-K were prepared based on formulations given in Table 3. The mole ratio of NCO groups to hydroxy (OH) groups in each paint formulation was 1.2:1. Ingredients for preparing grinds were mixed using a high speed Cowles disperser at 1,500 revolutions per minute (rpm) for 30 min to form the grinds. Then, ingredients in the letdown were added to the grinds using a conventional lab mixer to obtain the part A. The part A of each paint formulation was left overnight, and then part B was added into the part A using a high speed disperser at 600 rpm for 10 min to form the paint formulation.

TABLE 3

Paint formulations

| Paint formulation | Exs 1-5, and Comp Exs A-D and F-K | Ex 10 | Ex 11 | Ex 12 | Ex 13 |
|---|---|---|---|---|---|
| Part A, gram | 28.4 | 28.4 | 28.4 | 28.4 | 28.4 |
| Grind | | | | | |
| Water | 4 | 4 | 4 | 4 | 4 |
| OROTAN 681 | 0.49 | 0.49 | 0.49 | 0.49 | 0.49 |
| Tego Twin 4100 | 0.15 | 0.15 | 0.15 | 0.15 | 0.15 |
| Ammonia (28%) | 0.2 | 0.2 | 0.2 | 0.2 | 0.2 |
| Ti-Pure R-706 | 17.05 | 17.05 | 17.05 | 17.05 | 17.05 |
| ACRYSOL RM-8W | 0.46 | 0.46 | 0.46 | 0.46 | 0.46 |
| 902W | 0.05 | 0.05 | 0.05 | 0.05 | 0.05 |
| DI water | 6 | 6 | 6 | 6 | 6 |
| Letdown | | | | | |
| Binder | 42.67 | 41.07 | 41.89 | 41.63 | 41.83 |
| DI water | 3.41 | 5.01 | 4.19 | 4.45 | 4.25 |
| Alcohol alkoxylate | 2 | 2 | 2 | 2 | 2 |
| DOW ANOL DPnB | 2.08 | 2.08 | 2.08 | 2.08 | 2.08 |

TABLE 3-continued

| | Paint formulations | | | | |
|---|---|---|---|---|---|
| Paint formulation | Exs 1-5, and Comp Exs A-D and F-K | Ex 10 | Ex 11 | Ex 12 | Ex 13 |
| DOW ANOL PM | 1.39 | 1.39 | 1.39 | 1.39 | 1.39 |
| ACRYSOL RM-8W | 0.2 | 0.2 | 0.2 | 0.2 | 0.2 |
| NaNO$_2$ (15%) | 0.9 | 0.9 | 0.9 | 0.9 | 0.9 |
| Part B, gram | | | | | |
| Desmodur N3600 | 9.48 | 9.48 | 9.48 | 9.48 | 9.48 |
| DOW ANOL PGDA | 9.48 | 9.48 | 9.48 | 9.48 | 9.48 |
| Total | 100 | 100 | 100 | 100 | 100 |
| Solids content | 46.12% | 46.12% | 46.12% | 46.12% | 46.12% |

Ex 6 Paint Formulation

Ex 6 was prepared as in Ex 1 except the amounts of the alcohol alkoxylate and DI water used in the letdown stage were 1.6 g and 3.81 g, respectively.

Ex 7 Paint Formulation

Ex 7 was prepared as in Ex 1 except the amounts of the alcohol alkoxylate and DI water used in the letdown stage were 1.2 g and 4.21 g, respectively.

Ex 8 Paint Formulation

Ex 8 was prepared as in Ex 1 except the amounts of the alcohol alkoxylate and DI water used in the letdown stage were 1 g and 4.41 g, respectively.

Ex 9 Paint Formulation

Ex 9 was prepared as in Ex 1 except the amounts of the alcohol alkoxylate and DI water used in the letdown stage were 0.5 g and 4.91 g, respectively.

Comp Ex E Paint Formulation

Comp Ex E was prepared as in Ex 1 except the amount of DI water used in the letdown stage was 5.41 gram and no alcohol alkoxylate was used.

Comp Ex L Paint Formulation

Comp Ex L was prepared as in Ex 1 except PAO16 was used as the alcohol alkoxylate and the amounts of PAO16 and DI water used in the letdown stage were 1 g and 4.41 g, respectively.

Types of the binders and the alcohol alkoxylate used for preparing each of the paint formulations above are listed in Table 4. The above obtained paint formulations were evaluated according to the test methods described above and results are given in Table 4.

As shown in Table 4, the paint formulations comprising PAO6 ethoxylated alcohol (Comp Ex A), PAO7 ethoxylated alcohol containing 82% EO units (Comp Ex B), PAO8 alcohol alkoxylate containing 24% EO units (Comp Ex C), PAO9 alcohol alkoxylate with a Mn of 1040 (Comp Ex D), no alcohol alkoxylate (Comp Ex E), PAO10 polyalkylene glycol (Comp Ex F), PAO11 butanol-initiated polyalkylene glycol (Comp Ex G), PAO12 polyalkylene glycol with a Mn of 1900 (Comp Ex H), PAO13 polyethylene glycol (Comp Ex I), PAO14 butanol-initiated polybutylene glycol (Comp Ex J), or PAO15 polyalkylene glycol free of EO units (Comp Ex K) all provided paints with an unacceptable low DOI (DOI was not measurable). In addition, the paint formulation comprising 5% of PAO16 ethoxylated and propoxylated linear $C_8$-$C_{14}$ alcohol provided paints with an unacceptable low DOI (Comp Ex L).

In contrast, the paint formulations of the present invention all provided paints with higher DOI while achieving high gloss, acceptable hardness, and blister resistance properties (Exs 1-13).

TABLE 4

| Paint formulations and properties | | | | | | | |
|---|---|---|---|---|---|---|---|
| Paint formulation | Binder type | Alcohol alkoxylate type | Alcohol alkoxylate dosage[1] | DOI | Hardness | Gloss (20°/60°/85°) | Blister after QUV[2] |
| Ex 1 | PD1 | PAO1 | 10.0% | 88.8 | H | 81.3/90/97.6 | 4 |
| Ex 2 | PD1 | PAO2 | 10.0% | 78 | H | 79.7/90.9/97.9 | NA |
| Ex 3 | PD1 | PAO3 | 10.0% | 88.1 | H | 82.8/90.4/97.6 | NA |
| Ex 4 | PD1 | PAO4 | 10.0% | 88.5 | H | 80.7/89/98 | 4 |
| Ex 5 | PD1 | PAO5 | 10.0% | 81.3 | H | 79.2/89/98.1 | NA |
| Ex 6 | PD1 | PAO1 | 8.0% | 83.5 | H | 80.3/90.4/97.9 | 4 |
| Ex 7 | PD1 | PAO1 | 6.0% | 77.1 | H | 78.2/89.6/97.8 | 4 |
| Ex 8 | PD1 | PAO1 | 5.0% | 76.1 | H | 76.4/89.8/96.8 | 4 |
| Ex 9 | PD1 | PAO1 | 2.5% | 74.7 | H | 78.6/91.2/97.2 | NA |
| Ex 10 | PD2 | PAO1 | 10.0% | 81.1 | H | 80/90.6/97.7 | NA |
| Ex 11 | PD3 | PAO1 | 10.0% | 80.8 | H | 80.8/91.8/98.4 | NA |
| Ex 12 | PD4 | PAO1 | 10.0% | 87 | H | 83.3/93/98.3 | NA |
| Ex 13 | PD5 | PAO1 | 10.0% | 77.3 | H | 80.4/91.4/97.6 | NA |
| Comp Ex A | PD1 | PAO6 | 10.0% | not measurable | H | 67/89.1/94.6 | NA |

TABLE 4-continued

Paint formulations and properties

| Paint formulation | Binder type | Alcohol alkoxylate type | Alcohol alkoxylate dosage[1] | DOI | Hardness | Gloss (20°/60°/85°) | Blister after QUV[2] |
|---|---|---|---|---|---|---|---|
| Comp Ex B | PD1 | PAO7 | 10.0% | not measurable | H | 52.8/87.5/95.6 | NA |
| Comp Ex C | PD1 | PAO8 | 10.0% | not measurable | H | 81.1/95.5/97.8 | NA |
| Comp Ex D | PD1 | PAO9 | 10.0% | not measurable | H | 57.3/88.9/94.7 | NA |
| Comp Ex E | PD1 | no | 0 | not measurable | H | 63.5/89.2/95.6 | NA |
| Comp Ex F | PD1 | PAO10 | 10.0% | not measurable | H | 51.5/87.8/95.3 | NA |
| Comp Ex G | PD1 | PAO11 | 10.0% | not measurable | H | 69.9/90.6/96.8 | NA |
| Comp Ex H | PD1 | PAO12 | 10.0% | not measurable | H | 47.8/85/95.2 | NA |
| Comp Ex I | PD1 | PAO13 | 10.0% | not measurable | H | 42/83.9/93.3 | NA |
| Comp Ex J | PD1 | PAO14 | 10.0% | not measurable | H | 36.8/81.6/92 | NA |
| Comp Ex K | PD1 | PAO15 | 10.0% | not measurable | H | 51.5/87.9/94.4 | NA |
| Comp Ex L | PD1 | PAO16 | 5.0% | not measurable | H | 78.3/90.6/97.2 | NA |

[1]PAO dosage: by weight based on the dry weight of the acrylic emulsion polymer
[2]NA: not available

What is claimed is:

1. A composition for forming a coating, the composition comprising (A) an aqueous dispersion comprising an emulsion polymer and from 2% to 20% of an alcohol alkoxylate, by weight based on the weight of the emulsion polymer;
wherein the emulsion polymer comprises, by weight based on the weight of the emulsion polymer, greater than 15% of structural units of a hydroxy-functional alkyl (meth)acrylate and wherein the alcohol alkoxylate having a molecular weight of 1,000 g/mol has formula (I),

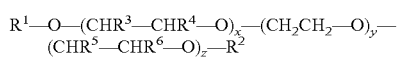

where $R^1$ is a $C_6$-$C_{18}$ branched aliphatic group; $R^2$ is hydrogen, a $C_1$-$C_4$ linear or branched aliphatic group, or benzyl; $R^3$ and $R^4$ are each independently hydrogen or a $C_1$-$C_6$ aliphatic group, provided that $R^3$ and $R^4$ together contain from 1 to 6 carbon atoms; $R^5$ and $R^6$ are each independently hydrogen or a $C_1$-$C_6$ aliphatic group, provided that $R^5$ and $R^6$ together contain from 1 to 6 carbon atoms; x is an average value ranging from 0 to 10; y is an average value ranging from 5 to 15; and z is an average value ranging from 0 to 5; provided that x+z>0, and (B) a polyisocyanate,
wherein the coating has a distinctness of image 74 or higher.

2. The composition for forming the coating, of claim 1, wherein, in formula (I), $R^3$ and $R^4$ are different and each independently hydrogen or methyl, z is 0, and the total value of x and y is from 7 to 14.

3. The composition for forming the coating of claim 2, wherein the alcohol alkoxylate comprises from 35% to 60% of the ethylene oxide units, by weight based on the weight of the alcohol alkoxylate.

4. The composition for forming the coating of claim 1, wherein, in formula (I), $R^5$ and $R^6$ are different and each independently hydrogen or ethyl, x is 0, y is from 7 to 14, and z is from 1 to 2.

5. The composition for forming the coating of claim 4, wherein the alcohol alkoxylate comprises from 45% to 68% of the ethylene oxide units, by weight based on the weight of the alcohol alkoxylate.

6. The composition for forming the coating, of claim 1, wherein, in formula (I), $R^1$ is 2-ethyl hexyl or

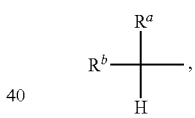

where $R^a$ and $R^b$ are each independently a $C_1$-$C_{17}$ aliphatic group, and $R^a$ and $R^b$ together contain from 7 to 17 carbon atoms.

7. The composition for forming the coating, of claim 1, wherein the polyisocyanate is selected from the group consisting of an aliphatic diisocyanate, dimers and trimers thereof, or mixtures thereof.

8. The composition for forming the coating, of claim 1, wherein the aqueous dispersion comprises from 2% to 15% of the alcohol alkoxylate, by weight based on the weight of the emulsion polymer.

9. The composition for forming the coating, of claim 1, wherein the alcohol alkoxylate has a molecular weight of from 400 to 900 g/mol.

10. The composition for forming the coating, of claim 1, wherein the hydroxy-functional alkyl (meth)acrylate is selected from the group consisting of 2-hydroxyethyl acrylate, 2-hydroxyethyl methacrylate, 2-hydroxypropylacrylate, 2-hydroxypropyl methacrylate, or mixtures thereof.

11. The composition for forming the coating, of claim 1, wherein the emulsion polymer further comprises, by weight based on the weight of the emulsion polymer, from 0.1% to 10% of structural units of one or more acid monomers, salts thereof, or mixtures thereof.

12. The composition for forming the coating, of claim 1, wherein the emulsion polymer has a weight average molecular weight of 50,000 g/mol or less.

13. The composition for forming the coating, of claim 1, wherein the emulsion polymer has a glass transition temperature of from 10 to 80° C.

14. The composition for forming the coating, of claim 1, wherein the equivalent ratio of the total number of isocyanate group equivalents in the polyisocyanate, to the total number of hydroxyl group equivalents in the aqueous dispersion is in the range of from 3:1 to 0.8:1.

15. A process of preparing the composition for forming the coating of claim 1, comprising:
   (i) providing an aqueous dispersion comprising an emulsion polymer and from 2% to 20% of an alcohol alkoxylate, by weight based on the weight of the emulsion polymer;
   wherein the emulsion polymer comprises, by weight based on the weight of the emulsion polymer, greater than 15% of structural units of a hydroxy-functional alkyl (meth)acrylate;
   wherein the alcohol alkoxylate having a molecular weight of 1,000 g/mol or less has formula (I),

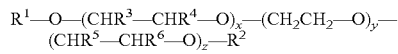

where $R^1$ is a $C_6$-$C_{18}$ branched aliphatic group; $R^2$ is hydrogen, a $C_1$-$C_4$ linear or branched aliphatic group, or benzyl; $R^3$ and $R^4$ are each independently hydrogen or a $C_1$-$C_6$ aliphatic group, provided that $R^3$ and $R^4$ together contain from 1 to 6 carbon atoms; $R^5$ and $R^6$ are each independently hydrogen or a $C_1$-$C_6$ aliphatic group, provided that $R^5$ and $R^6$ together contain from 1 to 6 carbon atoms; x is an average value ranging from 0 to 10; y is an average value ranging from 5 to 15; and z is an average value ranging from 0 to 5; provided that $x+z>0$;

wherein the alcohol alkoxylate comprises, by weight based on the weight of the alcohol alkoxylate, from 25% to 75% of ethylene oxide units; and (ii) mixing the aqueous dispersion from step (i) with a polyisocyanate.

16. The composition of claim 1 wherein the coating has a 60° gloss of 85 or higher and a 20° gloss of 75 or higher.

17. The composition of claim 1 wherein the composition has a hardness of H or higher and/or a blister resistance as evidenced by no blisters or no blisters of 0.2 mm or larger after exposure accelerated weathering test.

* * * * *